May 27, 1947. E. H. GALFORD 2,421,256
PLUMB LINE REEL
Filed Jan. 28, 1946

Inventor
*Everett H. Galford*

By *Clarence A. O'Brien
and Harvey B. Jacobson*
Attorneys

Patented May 27, 1947

2,421,256

UNITED STATES PATENT OFFICE 2,421,256

PLUMB LINE REEL

Everett H. Galford, Charleston, W. Va.

Application January 28, 1946, Serial No. 643,854

5 Claims. (Cl. 242—126)

The invention as described herein, and illustrated in the accompanying drawings, consists of a plumb line reel or spool, an object of which is to provide means whereby a plumb line with a bob, such as used by masons in plumbing walls, may be easily unwound from the spool.

Another object of the invention is to provide a spool for a plumb line having means whereby a line may be securely held intermediate its length while plumbing a wall.

A still further object of the invention is the provision of means whereby a plumb line may be unreeled from its spool very rapidly.

Other features and advantages will become more readily apparent from the following description and the accompanying illustrative drawings in which.

Figure 1:
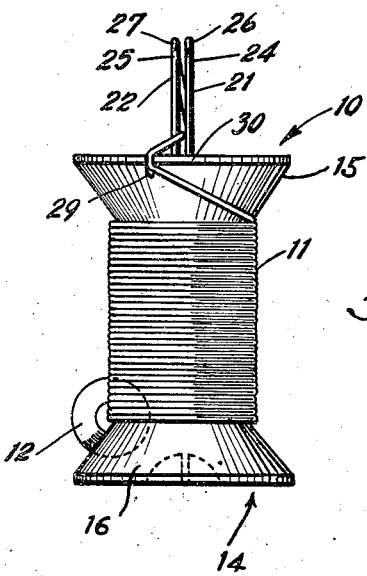
Figure 1 is an elevational view of the invention.
Figure 2:
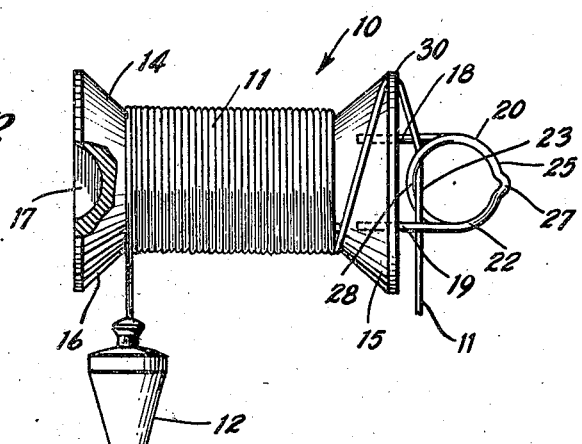
Figure 2 is a like view taken from another angle.
Figure 3:
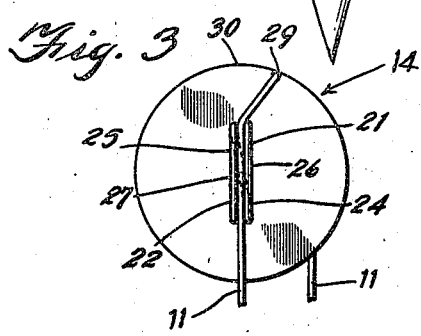
Figure 3 is an end view of the device.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 refers to the invention in its entirety and 11 indicates a plumb line to one end of which is attached a plumb bob 12. The line as shown is wound partially upon a spool 14 provided with enlarged outwardly flaring ends 15 and 16 in the face of the latter of which is a countersink 17 into which the fore-finger of a user is adapted to seat, as will later be explained.

Attached to the end 15 of the spool by means of extension arms 18 and 19 is a clamp or clip 20 formed of piano-spring wire coiled twice upon itself providing convolutions or rings 21 and 22 closely contacting one another and forming a secure clamp for holding an intermediate portion 23 of a line securely to prevent the line from slipping when in use. The outer peripheral portions 24 and 25 of said convolutions are provided with humps or teats 26 and 27 slightly separated and between which the line 23 may be forced down into the inner peripheral portion 28 of the clamp. Through this arrangement the line is caught twice in two offset places and on opposite sides of the inner convolution as at 28. The line is again offset through the snick 29 in the periphery 30 of the spool end 15.

The teats 26 and 27 also provide pivot points for the fore-finger of a user whose thumb may seat in the countersink 17 and by means of which through the weight of the plumb bob 12 the spool may be allowed to rotate between said fingers to unreel the line 11. The clamp member 20 being flat and sufficiently wide is adapted to be held between two bricks and thus the plumb bob and line may be secured in plumbing position for a mason to work.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

1. The described device comprising a spool with enlarged ends, one of which is countersunk and a clamp attached to the other, said clamp consisting of a pair of resilient jaws consisting of spring wire formed into contacting convolutions, each convolution including hump means whereby a line may be guided into the clamp, and one of said ends provided with a snick for the line, said snick being offset from the clamp.

2. The described device comprising a spool with enlarged ends, one of which is countersunk and a clamp attached to the other, said clamp consisting of a pair of resilient jaws consisting of spring wire formed into contacting convolutions, each convolution including hump means whereby a line may be guided into the clamp, and one of said ends provided with a snick for the line.

3. The described device comprising a spool with enlarged ends, one of which is countersunk and a clamp attached to the other, said clamp consisting of a pair of resilient jaws consisting of spring wire formed into contacting convolutions, each convolution including hump means whereby a line may be guided into the clamp.

4. The described device comprising a spool with enlarged ends, one of which is countersunk and a clamp attached to the other, said clamp consisting of a pair of resilient jaws consisting of spring wire formed into contacting convolutions, and each convolution including a teat.

5. The described device comprising a spool with enlarged ends, one of which is countersunk and a clamp attached to the other, said clamp consisting of a pair of resilient jaws consisting of spring wire formed into contacting convolutions.

EVERETT H. GALFORD.

REFERENCES CITED

The following references are of record in the file of this patent:

UNITED STATES PATENTS

| Number | Name | Date |
|---|---|---|
| 268,198 | Davis | Nov. 28, 1882 |
| 1,851,314 | Knoche | March 29, 1932 |